March 1, 1932.                H. T. SEELEY                1,847,905
                             PROTECTIVE SYSTEM
                             Filed Nov. 19, 1929
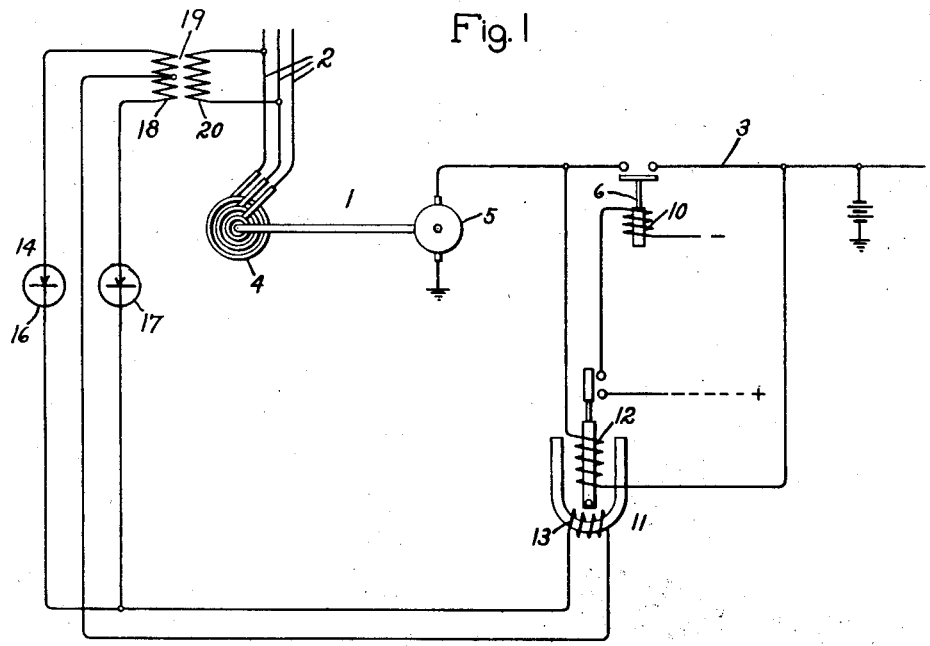
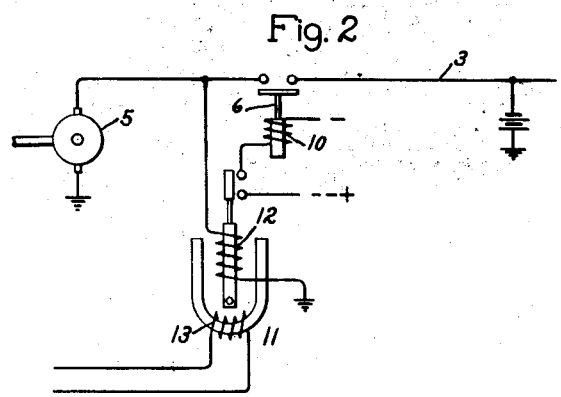
Inventor:
Harold T. Seeley,
by Charles E. Tullar
His Attorney.

Patented Mar. 1, 1932

1,847,905

UNITED STATES PATENT OFFICE

HAROLD T. SEELEY, OF YEADON, PENNSYLVANIA, ASSIGNOR TO GENERAL ELECTRIC COMPANY, A CORPORATION OF NEW YORK

PROTECTIVE SYSTEM

Application filed November 19, 1929. Serial No. 408,344.

My invention relates to protective systems and particularly to systems for controlling a direct current source in accordance with the polarity thereof and its object is to provide an improved reverse polarity protective arrangement for a direct current source.

My invention will be better understood from the following description when taken in connection with the accompanying drawings and its scope will be pointed out in the appended claims.

In the accompanying drawings, Fig. 1 diagrammatically illustrates a reverse polarity protective system embodying my invention and Fig. 2 diagrammatically illustrates another embodiment of my invention.

Referring to Fig. 1 of the drawings, I have shown my invention in connection with a reverse polarity protective system for an A. C. to D. C. translating device such as a motor generator set 1 which is arranged to translate electric energy from an alternating current supply circuit 2 to a direct current load circuit 3. The motor generator set comprises a motor 4 connected to the supply circuit 2 and a direct current generator 5 which is arranged to be connected to the load circuit 3 by means of a suitable circuit breaker 6.

Before the circuit breaker 6 is closed to connect the generator 5 to the load circuit 3, the generator voltage should have a predetermined polarity and, in some cases, the voltage should exceed the load circuit voltage by a predetermined amount. For accomplishing this result, it has been the practice to control the closing circuit of the circuit breaker 6 by means of a polarized relay comprising two windings, one of which has been connected across the terminals of the circuit breaker and the other of which has been connected across the terminals of the direct current source. With the relay connected in this manner there is a possibility of the relay effecting the closing of the circuit breaker in response to conditions under which the circuit breaker should remain open. For example, if the generator voltage builds up in the wrong direction, the relay operates to effect the closing of the circuit breaker when the generator voltage is less than the load circuit voltage.

In accordance with my invention, I provide an arrangement for energizing the polarized relay whereby the relay cannot effect the closing of the circuit breaker under such conditions. In the particular embodiment of my invention shown in Fig. 1 the circuit of the closing coil 10 of the circuit breaker 6 is controlled by a polarized relay 11 which has an operating winding 12 connected across the main terminals of the circuit breaker 6 and a magnetizing winding 13 which is supplied with direct current by means of a suitable full-wave rectifying device 14 interposed between the magnetizing winding 13 and the supply circuit 2. As shown in the drawings, the full wave rectifying device includes two rectifiers 16 and 17 respectively connected between one end of the magnetizing winding 13 and the two end terminals of the secondary winding 18 of a potential transformer 19, the primary winding 20 of which is connected across one phase of the supply circuit 2. The other end of the magnetizing winding 13 is connected to the midpoint of the secondary winding 18 of the potential transformer 19. The rectifiers 16 and 17 may be of any suitable type, examples of which are well known in the art.

With the arrangement above described, it will be observed that when both of the rectifiers 16 and 17 are in an operative condition, each half wave of the voltage induced in the secondary winding 18 of the potential transformer 19 causes current to flow through the magnetizing winding 13 in a predetermined direction and, therefore, the polarized relay 11 always operates in response to a predetermined polarity of the generator 5. Consequently, any reversal of the polarity of the generator 5 does not cause the polarized relay 11 to operate so as to effect the energization of the closing coil 10 of the circuit breaker 6.

Furthermore, by using a rectified alternating current to excite the magnetizing winding 13 of the relay 11 a failure of the rectifiers 16 and 17 either by open circuit or short-circuit will partially or completely remove the excitation of the polarized relay so that the relay cannot operate to effect the closing of the circuit breaker 6. In other words, failure of the rectifying means 14 cannot cause an incorrect operation of the polarity responsive arrangement.

In cases where it is desirable merely to obtain an indication of the polarity of the generator 5, the operating winding 12 of the polarized relay 11 may be connected across the terminals of the generator 5 as shown in Fig. 2. With this arrangement the relay 11 operates independently of the relative voltages of the generator 5 and the load circuit 3.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. In combination, a source of alternating current, an A. C. to D. C. translating device connected to said source, a polarized relay including an operating winding connected to the direct current side of said translating device so as to be energized in response to the polarity thereof and a magnetizing winding, and rectifying means interposed between said source of alternating current and said magnetizing winding.

2. In combination, a source of alternating current, an A. C. to D. C. translating device connected to said source, a polarized relay including an operating winding connected to the direct current side of said translating device so as to be energized in response to the polarity thereof and a magnetizing winding, and full-wave rectifying means connected between said source of alternating current and said magnetizing winding.

3. In combination, an alternating current source, an A. C. to D. C. translating device connected to said source, a transformer having a primary winding connected to said source and a secondary winding, a polarized relay including an operating winding connected to said direct current side of said translating device so as to be energized in response to the polarity thereof and a magnetizing winding one end of which is connected to the midpoint of said transformer secondary winding, a rectifier connected between one end terminal of said transformer secondary winding and the other end of said magnetizing winding and another rectifier connected between the other end terminal of said transformer secondary winding and said other end of said magnetizing winding.

4. In combination, an alternating current supply circuit, a direct current load circuit, an A. C. to D. C. translating device connected to said supply circuit, a polarized relay for controlling the connection of said device to said load circuit including an operating winding connected to the direct current side of said device so as to be energized in accordance with the polarity thereof and a magnetizing winding, and rectifying means interposed between said supply circuit and said magnetizing winding.

5. In combination, an alternating current supply circuit, a direct current load circuit, an A. C. to D. C. translating device connected to said supply circuit, a polarized relay for controlling the connection of said device to said load circuit including an operating winding connected between the direct current side of said device and said load circuit and a magnetizing winding, and rectifying means interposed between said supply circuit and said magnetizing winding.

6. In combination, an alternating current supply circuit, a direct current load circuit, an A. C. to D. C. translating device connected to said supply circuit, a polarized relay for controlling the connection of said device to said load circuit including an operating winding connected to the direct current side of said device so as to be energized in accordance with the polarity thereof and a magnetizing winding, a transformer having its primary winding energized from said supply circuit and the midpoint of its secondary winding connected to one terminal of said magnetizing winding, and rectifying means connected between each of the end terminals of the transformer secondary winding and the other end terminal of said magnetizing winding.

In witness whereof, I have hereunto set my hand this 15th day of November, 1929.

HAROLD T. SEELEY.